(12) United States Patent
Hofer et al.

(10) Patent No.: US 11,506,208 B2
(45) Date of Patent: Nov. 22, 2022

(54) ASSEMBLY FOR THE HYBRID PROPULSION OF A MOTOR VEHICLE PUMP

(71) Applicant: HANON SYSTEMS EFP DEUTSCHLAND GMBH, Bad Homburg v. d. Höhe (DE)

(72) Inventors: Michael Hofer, Winklam (AT); Christian Humer, Garsten (AT); Michael Wadsack, Amstetten (AT); Viktor Racz, St. Valentin (AT)

(73) Assignee: HANON SYSTEMS EFP DEUTSCHLAND GMBH, Bad Homburg v. d. Höhe (DE)

( * ) Notice: Subject to any disclaimer, the term of this patent is extended or adjusted under 35 U.S.C. 154(b) by 87 days.

(21) Appl. No.: 17/258,680

(22) PCT Filed: Jul. 16, 2019

(86) PCT No.: PCT/DE2019/200080
§ 371 (c)(1),
(2) Date: Jan. 7, 2021

(87) PCT Pub. No.: WO2020/015801
PCT Pub. Date: Jan. 23, 2020

(65) Prior Publication Data
US 2021/0293241 A1 Sep. 23, 2021

(30) Foreign Application Priority Data

Jul. 16, 2018 (DE) ..................... 10 2018 211 799.3

(51) Int. Cl.
*F04D 13/02* (2006.01)
*F02B 63/06* (2006.01)
(Continued)

(52) U.S. Cl.
CPC ............ *F04D 13/028* (2013.01); *B60K 6/383* (2013.01); *F02B 33/34* (2013.01); *F02B 33/40* (2013.01);
(Continued)

(58) Field of Classification Search
CPC .......... F02B 39/04; F02B 39/10; F02B 39/12; F02B 33/40; F02B 33/34; F02B 63/06;
(Continued)

(56) References Cited

U.S. PATENT DOCUMENTS 2,908,189 A * 10/1959 Chapman ................ F02C 7/275
60/788
3,306,219 A 2/1967 Englesson
(Continued)

FOREIGN PATENT DOCUMENTS

CN 2603234 Y 2/2004
CN 201360201 Y 12/2009
(Continued)

OTHER PUBLICATIONS

Chinese Office Action regarding Chinese Application No. 201980047264.3, dated Feb. 8, 2022.
(Continued)

*Primary Examiner* — Peter J Bertheaud
(74) *Attorney, Agent, or Firm* — Harness, Dickey & Pierce, P.L.C.

(57) ABSTRACT

A pump assembly for a motor vehicle, comprising at least one mechanical drive, at least one electric drive, and at least one planetary gearbox, wherein the mechanical drive and the electric drive are coupled to one another via the planetary gearbox, the electric drive comprising a rotor shaft that is designed as a hollow shaft, wherein the rotor shaft is
(Continued)

mounted at one side on a housing of the pump assembly via a ball bearing and at the other side in a gear stage of the planetary gearbox.

8 Claims, 6 Drawing Sheets

(51) Int. Cl.
| | | |
|---|---|---|
| *F02B 67/06* | (2006.01) | |
| *F04D 13/06* | (2006.01) | |
| *F04D 29/043* | (2006.01) | |
| *F04D 29/046* | (2006.01) | |
| *F02B 39/04* | (2006.01) | |
| *F02B 39/12* | (2006.01) | |
| *F02B 33/40* | (2006.01) | |
| *F02B 39/10* | (2006.01) | |
| *F02B 33/34* | (2006.01) | |
| *F16H 1/28* | (2006.01) | |
| *F16H 47/04* | (2006.01) | |
| *B60K 6/383* | (2007.10) | |
| *F04D 25/06* | (2006.01) | |

(52) U.S. Cl.
CPC ............. *F02B 39/04* (2013.01); *F02B 39/10* (2013.01); *F02B 39/12* (2013.01); *F02B 63/06* (2013.01); *F02B 67/06* (2013.01); *F04D 13/06* (2013.01); *F04D 25/0606* (2013.01); *F04D 29/043* (2013.01); *F04D 29/046* (2013.01); *F16H 1/28* (2013.01); *F16H 47/04* (2013.01); *Y02T 10/12* (2013.01); *Y02T 10/62* (2013.01)

(58) Field of Classification Search
CPC .......... F02B 67/06; Y02T 10/62; Y02T 10/12; B60K 6/365; B60K 6/383; F16H 1/28; F16H 47/04; F04D 25/028; F04D 13/028; F04D 25/0606; F04D 13/06; F04D 29/043; F04D 29/046

See application file for complete search history.

(56) References Cited

U.S. PATENT DOCUMENTS

| | | | |
|---|---|---|---|
| 7,703,283 B2 * | 4/2010 | Barker | ............... F04D 25/028 475/5 |
| 2008/0020887 A1 | 1/2008 | Moeller | |
| 2012/0101676 A1 | 4/2012 | Ichioka et al. | |
| 2013/0274047 A1 | 10/2013 | Gotz | |
| 2013/0324352 A1 | 12/2013 | Nomura et al. | |
| 2018/0010668 A1 | 1/2018 | Hirano | |
| 2021/0189950 A1 * | 6/2021 | Akimoto | ............... F02B 39/12 |

FOREIGN PATENT DOCUMENTS

| | | | | |
|---|---|---|---|---|
| CN | 101947004 A | 1/2011 | | |
| CN | 103210244 A | 7/2013 | | |
| CN | 207297764 U | 5/2018 | | |
| DE | 10214637 A1 | 10/2003 | | |
| DE | 102011079800 A1 | 2/2012 | | |
| DE | 112009004769 T5 | 10/2012 | | |
| DE | 112016000217 T5 | 9/2017 | | |
| DE | 112012000461 B4 | 6/2018 | | |
| GB | 2478716 A | 9/2011 | | |
| WO | WO 2017/145778 A1 * | 8/2017 | ............. F02B 39/04 | |

OTHER PUBLICATIONS

Chinese Search Report regarding Chinese Application No. 201980047264.3, dated Jan. 28, 2022.

* cited by examiner

ASSEMBLY FOR THE HYBRID PROPULSION OF A MOTOR VEHICLE PUMP

CROSS-REFERENCE TO RELATED APPLICATIONS

This application is a U.S. National Phase Application under 35 U.S.C. 371 of International Application No. PCT/DE2019/200080, filed on Jul. 16, 2019, which claims the benefit of German Patent Application No. 10 2018 211 799.3, filed on Jul. 16, 2018. The entire disclosures of each of the above applications are incorporated herein by reference.

FIELD

The present disclosure relates to a pump assembly for a motor vehicle, comprising at least one mechanical drive, at least one electric drive, and at least one planetary gearbox, wherein the mechanical drive and the electric drive are coupled to one another via the planetary gearbox.

BACKGROUND

This section provides background information related to the present disclosure which is not necessarily prior art.

An assembly of the aforementioned type is described in DE 102 14 637 A1, for example. DE 102 14 637 A1 discloses a hybrid drive comprising, essentially concentrically about the drive shaft, a planetary drive, at least one electric motor and at least one mechanical drive, the planetary drive being able to be driven by the electric motor and/or the mechanical drive.

These types of hybrid assemblies are in particular used for pumps in motor vehicles, although an undesirably high level of noise can occur during operation of the pump.

SUMMARY

This section provides a general summary of the disclosure, and is not a comprehensive disclosure of its full scope or all of its features.

An object of the disclosure is to provide an improved pump assembly which ensures reduction of operating noise while providing a simple and easy-to-assemble structure with a reduced number of components.

The object is solved by a pump assembly for a motor vehicle comprising at least one mechanical drive, at least one electric drive, and at least one planetary gearbox, wherein the mechanical drive and the electric drive are coupled to one another via the planetary gearbox, the electric drive comprises a rotor shaft that is designed as a hollow shaft, and the rotor shaft is mounted at one side on a housing of the pump assembly via a ball bearing and at the other side in a gear stage of the planetary gearbox.

The pump assembly according to the disclosure is preferably used in a motor vehicle; however, it can also be used in any other mechanical structure, as required.

According to the disclosure, the pump assembly comprises at least one mechanical drive, one electric drive and one planetary gearbox. The mechanical drive is, for example, an internal combustion engine of a motor vehicle. The electric drive is, for example, an electric machine that can be operated both as an electric motor and a generator. In accordance with the present disclosure, the mechanical drive and the electric drive are actively coupled to one another in terms of drive via the planetary gearbox.

According to the disclosure, the electric drive comprises a rotor shaft, the rotor shaft being designed as a hollow shaft.

According to the present disclosure, the rotor shaft of the electric drive is radially mounted at one side on a housing of the pump assembly via a ball bearing and at the other side in a gear stage of the planetary gearbox.

The pump assembly according to the disclosure has a simple structure, which is in particular NHV-reduced and can furthermore be realized in a cost-effective manner owing to the design thereof that is optimized in terms of components.

Further developments of the disclosure are provided in the dependent claims, the description and the enclosed drawings.

In an advantageous embodiment of the present disclosure, the planetary gearbox comprises a ring gear, a sun gear and three planet gears, the rotor shaft of the electric drive being fixedly connected to the sun gear of the planetary gearbox, and the rotor shaft thus being supported in the planetary gearbox via the backlash of the planet gears.

The mechanical drive preferably comprises a belt pulley, with the belt pulley being able to be actively connected in terms of drive to the ring gear of the planetary gearbox or with the belt pulley being designed so as to directly form the ring gear of the planetary gearbox.

The electric drive comprises a rotor and a stator, with the rotor and the ball bearing being preferably fixedly connected to the rotor shaft.

In a preferred embodiment variant of the present disclosure, the rotor shaft of the electric drive comprises, over the circumference, at least one installation opening.

Via these installation openings, a subassembly consisting of a rotor shaft, a rotor, a sun gear and a ball bearing, for example, can be positioned in a simple manner within the pump assembly by means of a suitable installation tool, without subjecting the ball bearing to high mechanical loads.

It is further advantageous if the pump assembly is designed so that a first spacing between the ball bearing and the electric drive is smaller than a second spacing between the ball bearing and the planetary gearbox. In such a manner, the air gap between a rotor and a stator of the electric drive can be set to an operationally optimal range, as a result of which power losses and axial forces on the ball bearing can be minimized.

DRAWINGS

The drawings described herein are for illustrative purposes only of selected embodiments and not all possible implementations, and are not intended to limit the scope of the present disclosure.

The disclosure will be described in the following by way of examples, with reference to the drawings.

DETAILED DESCRIPTION

Example embodiments will now be described more fully with reference to the accompanying drawings.

Figure 1:
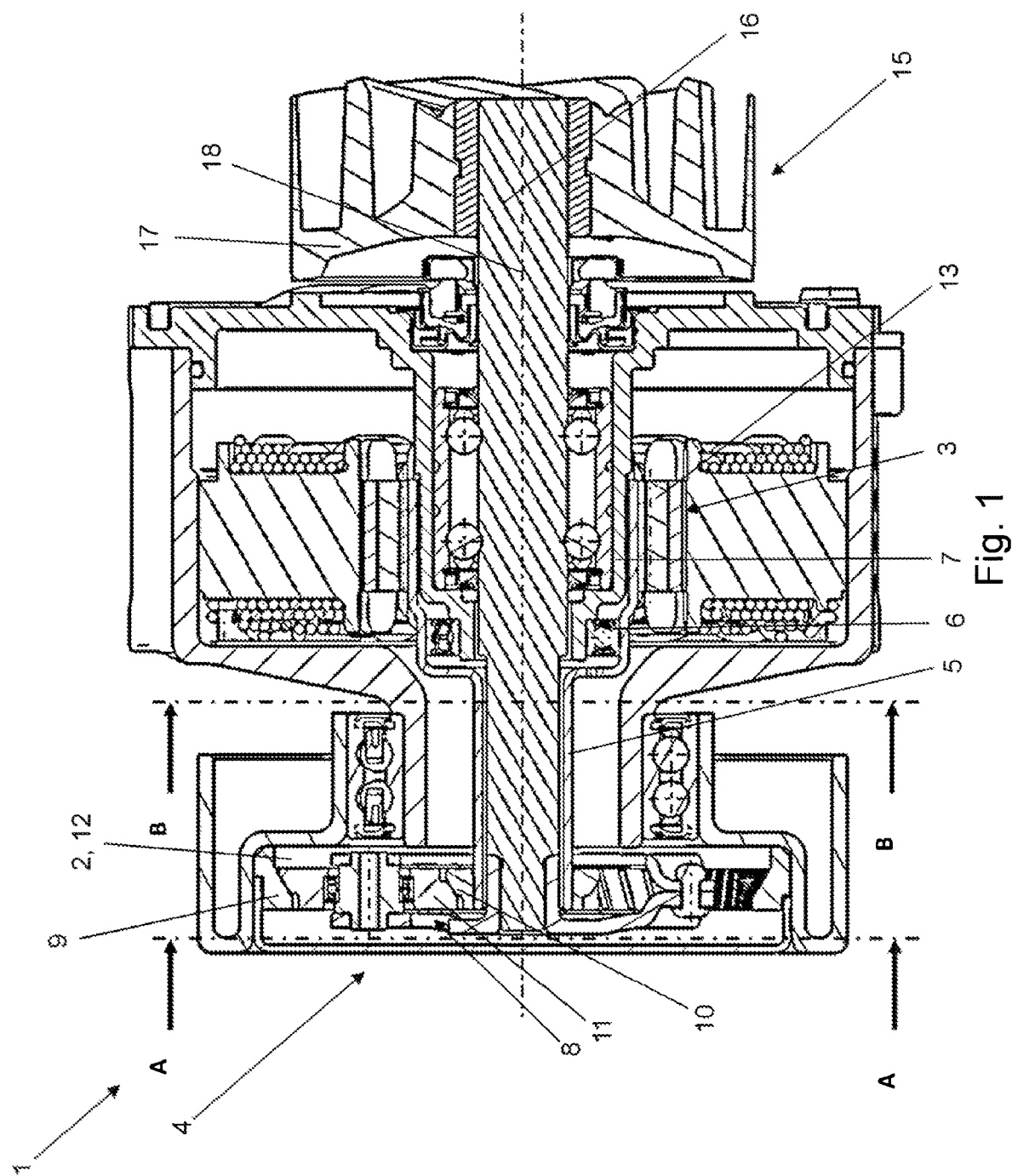
FIG. 1 shows a sectional view of an exemplary pump assembly.

FIG. 1 shows an exemplary embodiment of a pump assembly 1 according to the disclosure.

The pump assembly 1 comprises a pump 15, a mechanical drive 2, an electric drive 3, and a planetary gearbox 4 (FIG. 1).

Figure 3:
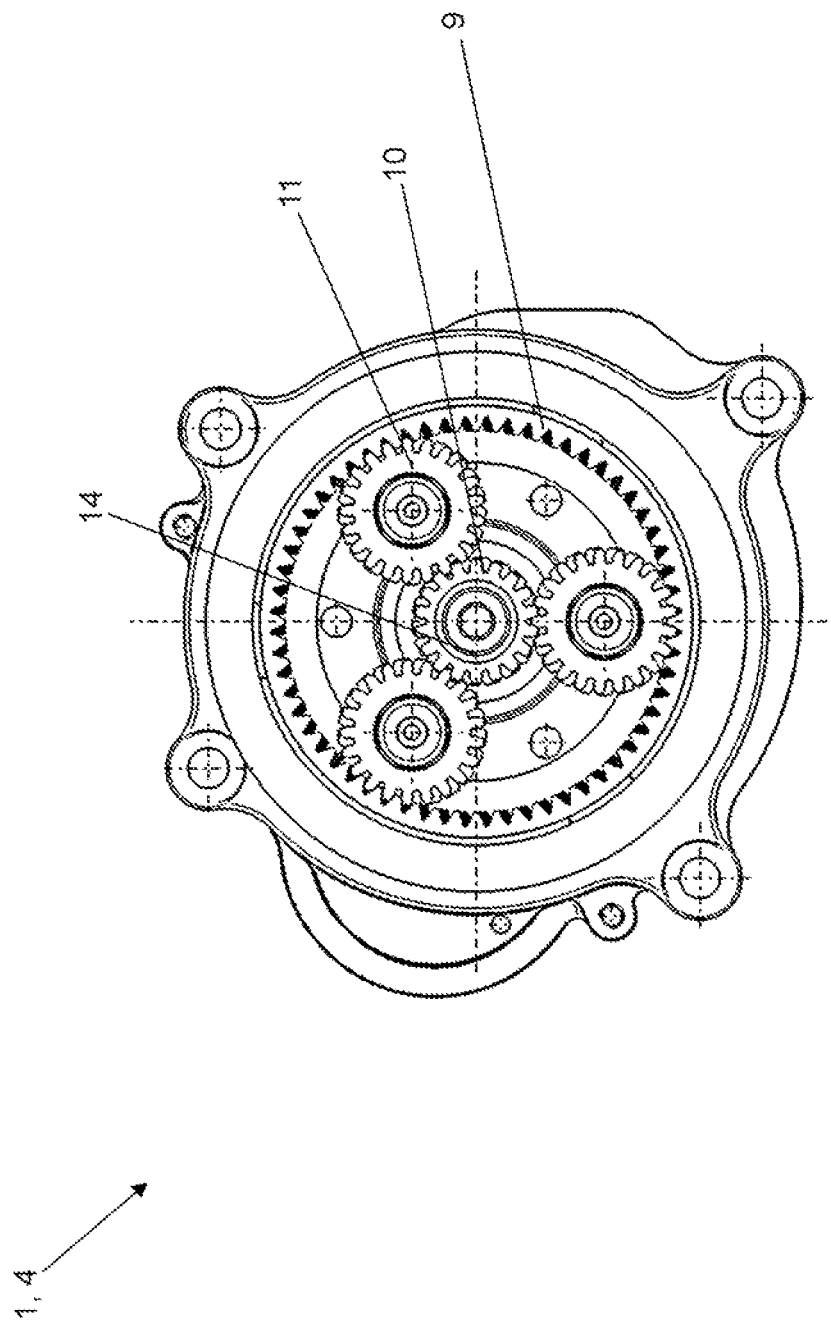
FIG. 3 shows a sectional view of a pump assembly along the cutting plane A-A according to FIG. 1.

The mechanical drive 2 and the electric drive 3 of the pump assembly 1 are coupled to one another via the planetary gearbox 4. The planetary gearbox 4 has a conventional structure with a ring gear 9, a sun gear 10 and three planet gears 11 (FIG. 1, FIG. 3).

The mechanical drive 2 is realized by means of an internal combustion engine of a motor vehicle. The internal combustion engine is actively connected in terms of drive to the planetary gearbox 4, more specifically to the ring gear 9 of the planetary gearbox 4, via a belt pulley 12 (FIG. 1).

Figure 2:
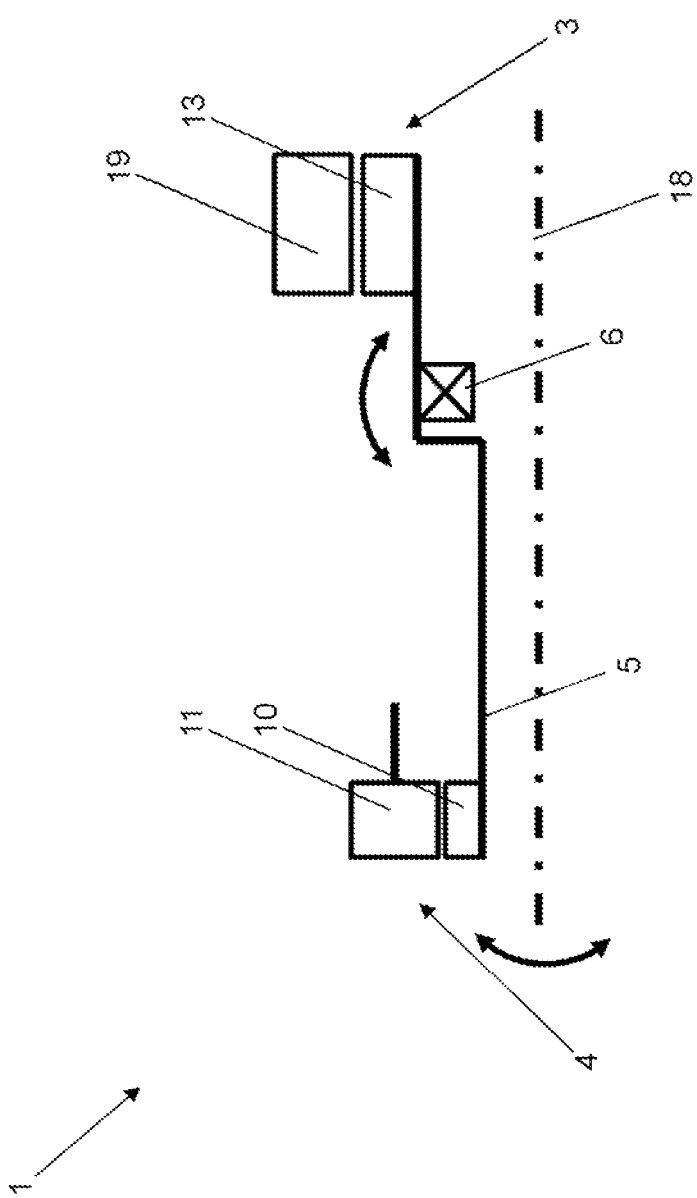
FIG. 2 shows a schematic illustration of a pump assembly according to FIG. 1.
Figure 6:
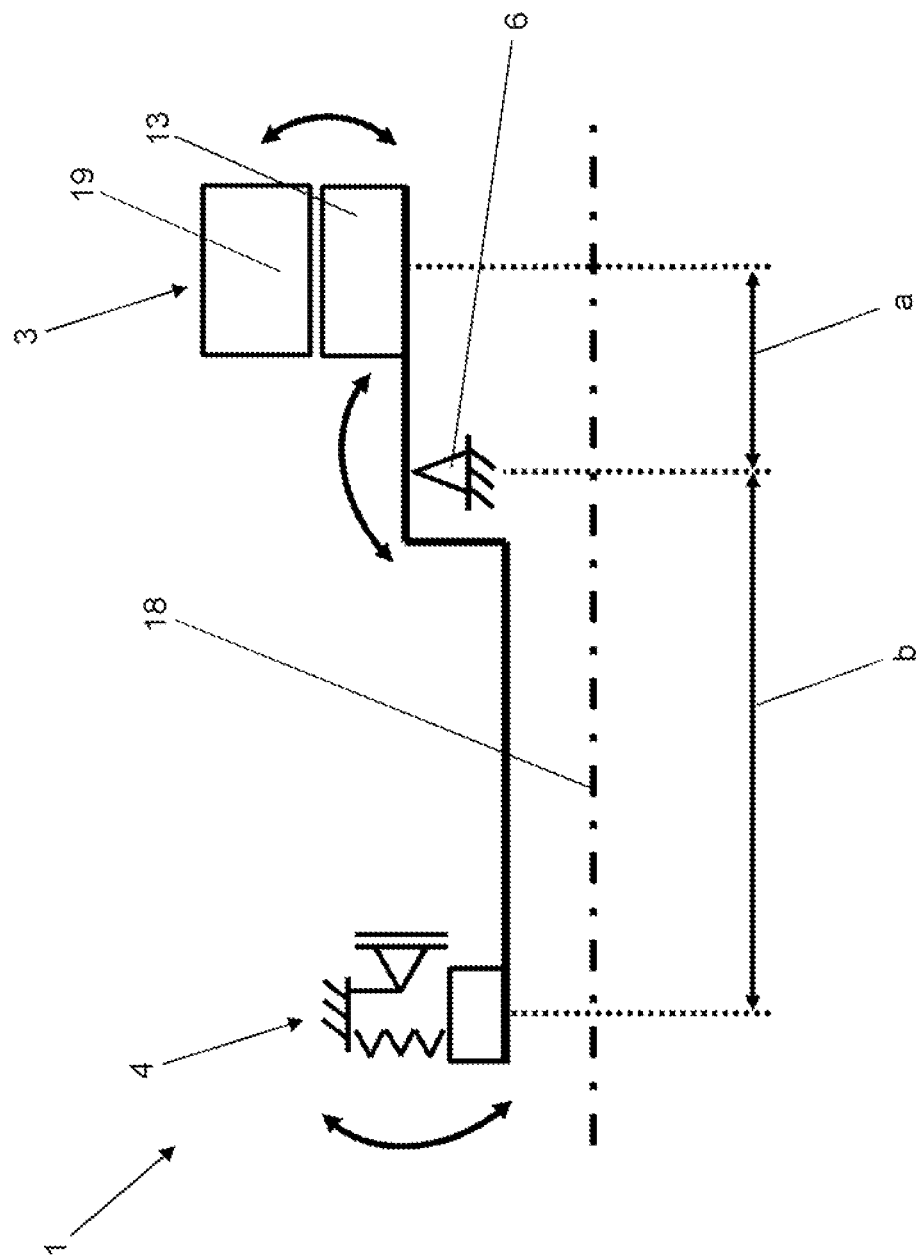
FIG. 6 shows a further schematic illustration of a pump assembly according to FIG. 1.

The electric drive 3 is realized by means of an electric machine. The electric machine comprises a rotor shaft 5 designed as a hollow shaft, a rotor 13 and a stator 19. The rotor 13 is integrally formed with the rotor shaft 5 (FIG. 1, FIG. 2, FIG. 6).

The pump 15 comprises a pump impeller 17 that is fixedly connected to a pump drive shaft 16. The pump drive shaft 16 is at least partially arranged in a housing 7 of the pump assembly 1 and is centrally mounted therein along a central axis of rotation 18. With its end that is opposite the pump impeller 17, the pump drive shaft 16 protrudes into the rotor shaft 5 of the electric drive 3 that is formed as a hollow shaft. The rotor shaft 5 furthermore at least partially surrounds the housing 7 of the pump assembly 1 (FIG. 1).

The sun gear 10 of the planetary gearbox 4 is fixedly arranged at the end of the rotor shaft 5 of the electric drive 3 that is opposite the rotor 13. Furthermore, a single-row ball bearing 6 is fixedly arranged on the rotor shaft 5 between the sun gear 10 and the rotor 13, in the region of the rotor 13. The rotor shaft 5 is mounted, on the one hand, on the housing 7 of the pump assembly 1 via the single-row ball bearing 6 and, on the other hand, in the planetary gearbox 4 via the backlash of the planet gears 11 (FIG. 1, FIG. 2, FIG. 6).

The rotor shaft 5 of the electric drive 3, the rotor 13 integrally formed with the rotor shaft 5, the ball bearing 6 fixedly arranged on the rotor shaft 5, and the sun gear 10 of the planetary gearbox 4, which is fixedly arranged on the rotor shaft 5, form a unit, i.e. a subassembly.

Figure 4:
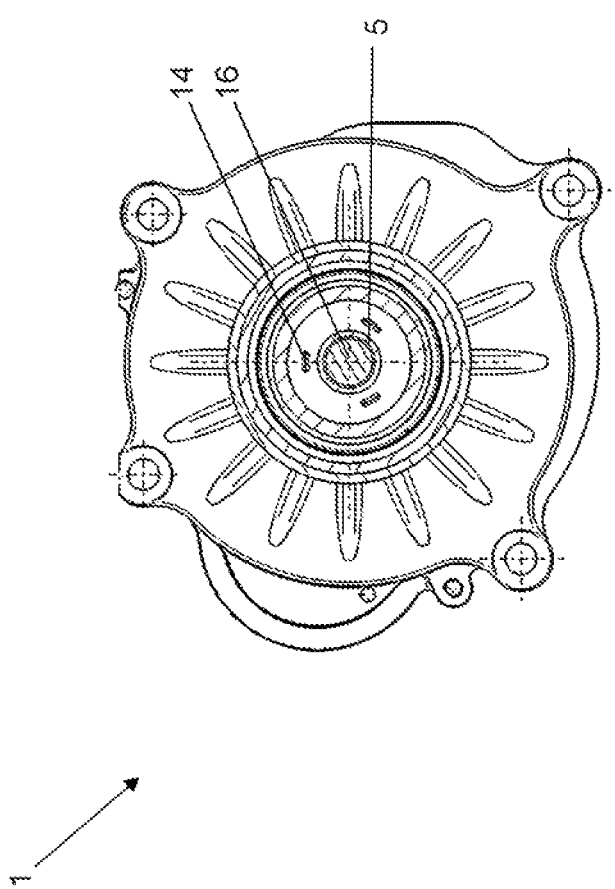
FIG. 4 shows a further sectional view of a pump assembly along the cutting plane B-B according to FIG. 1.
Figure 5:
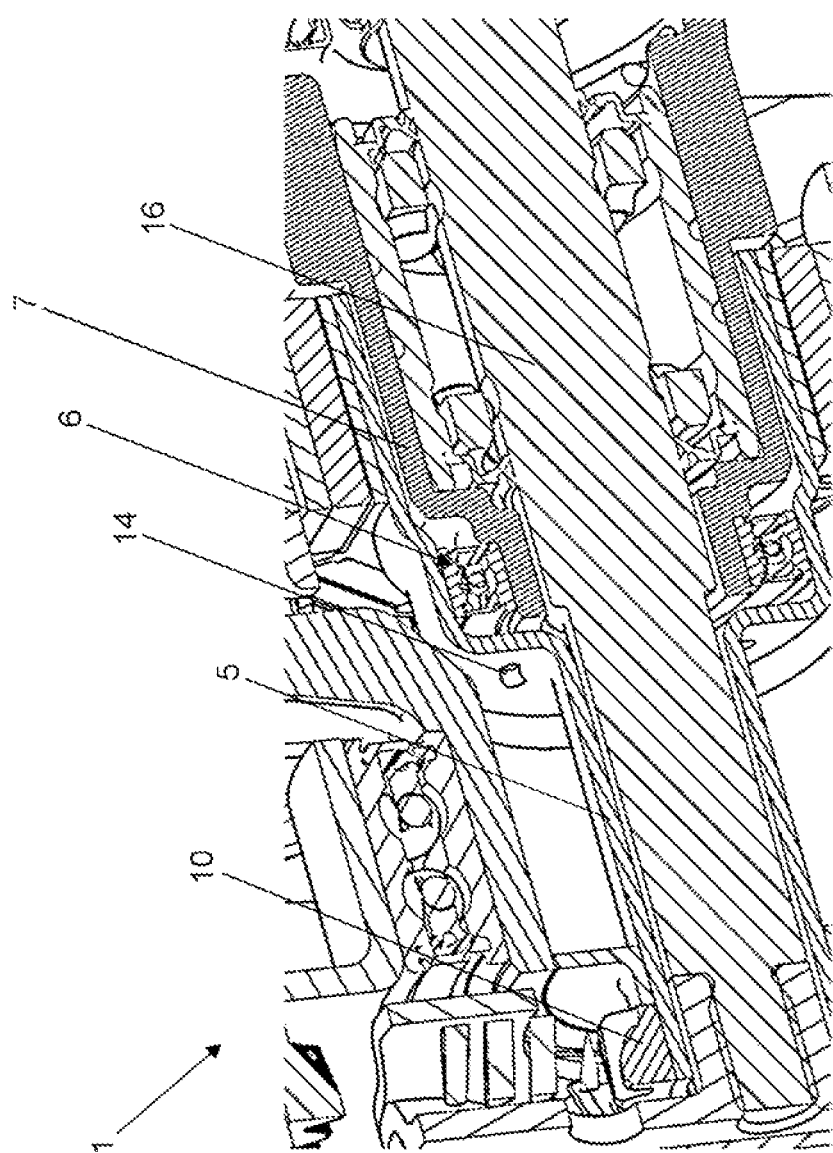
FIG. 5 shows a detailed view of a pump assembly according to FIG. 1.

Three installation openings 14 are formed on the rotor shaft 5, which are evenly spaced over the circumference (FIG. 4, FIG. 5). Via these installation openings 14, the entire subassembly consisting of a rotor shaft 5, a rotor 13, a sun gear 10 and a ball bearing 6 can be positioned in a simple manner within the pump assembly by means of a suitable installation tool, without subjecting the ball bearing 6 to high mechanical loads.

The ball bearing 6 of the pump assembly is arranged on the housing 7 in such a manner that a first spacing a, specifically the spacing between the ball bearing 6 and the electric drive 3, is smaller than a second spacing b, specifically the spacing between the ball bearing 6 and the planetary gearbox 4 (FIG. 6).

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A pump assembly for a motor vehicle, comprising:
   at least one mechanical drive;
   at least one electric drive; and
   at least one planetary gearbox,
   wherein the mechanical drive and the electric drive are coupled to one another via the planetary gearbox, the electric drive comprising a rotor shaft that is designed as a hollow shaft, wherein the rotor shaft at least partially surrounds a housing of the pump assembly, wherein the rotor shaft is mounted at one side on the housing of the pump assembly via a ball bearing and at the other side in a gear stage of the planetary gearbox, and wherein the ball bearing is disposed inside the rotor shaft.

2. The pump assembly according to claim 1,
   wherein the planetary gearbox comprises a ring gear, a sun gear and three planet gears, the rotor shaft of the electric drive being fixedly connected to the sun gear of the planetary gearbox, and the rotor shaft thus being supported in the planetary gearbox via the backlash of the planet gears.

3. The pump assembly according to claim 2,
   wherein the mechanical drive comprises a belt pulley, the belt pulley being actively connected in terms of drive to the ring gear of the planetary gearbox.

4. The pump assembly according to claim 2,
   wherein the mechanical drive comprises a belt pulley, the belt pulley being designed so as to form the ring gear of the planetary gearbox.

5. The pump assembly according to claim 2,
   wherein the electric drive comprises a rotor, the rotor and the ball bearing being fixedly connected to the rotor shaft.

6. The pump assembly according to claim 1,
   wherein the rotor shaft of the electric drive comprises, over the circumference, at least one installation opening.

7. The pump assembly according to claim 1,
   wherein a first spacing (a), specifically a spacing between the ball bearing and the electric drive, is smaller than a second spacing (b), specifically a spacing between the ball bearing and the planetary gearbox.

8. A pump assembly for a motor vehicle, comprising:
   at least one mechanical drive;
   at least one electric drive; and
   at least one planetary gearbox,
   wherein the mechanical drive and the electric drive are coupled to one another via the planetary gearbox, the electric drive comprising a rotor shaft that is designed as a hollow shaft, wherein the rotor shaft is mounted at one side on a housing of the pump assembly via a ball bearing and at the other side in a gear stage of the planetary gearbox,
   wherein the planetary gearbox comprises a ring gear, a sun gear and three planet gears, and wherein the mechanical drive comprises a belt pulley, the belt pulley being designed to form the ring gear of the planetary gearbox.

\* \* \* \* \*